(12) United States Patent
Monk et al.

(10) Patent No.: US 8,411,565 B2
(45) Date of Patent: *Apr. 2, 2013

(54) BROADBAND NETWORK FOR COAXIAL CABLE USING MULTI-CARRIER MODULATION

(75) Inventors: Anton Monk, San Diego, CA (US);
Brett Bernath, San Diego, CA (US);
Itzhak Gurantz, San Diego, CA (US);
Ladd El Wardani, Las Vegas, NV (US);
Ron Porat, La Jolla, CA (US)

(73) Assignee: Entropic Communications, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,907

(22) Filed: Apr. 20, 2011

(65) Prior Publication Data

US 2011/0194636 A1 Aug. 11, 2011

Related U.S. Application Data

(60) Division of application No. 12/538,339, filed on Aug. 10, 2009, now abandoned, which is a continuation of application No. 11/938,770, filed on Nov. 12, 2007, now Pat. No. 7,573,822, which is a continuation of application No. 10/322,834, filed on Dec. 18, 2002, now Pat. No. 7,295,518, which is a continuation of application No. 10/230,687, filed on Aug. 29, 2002, now abandoned.

(60) Provisional application No. 60/316,820, filed on Aug. 30, 2001, provisional application No. 60/363,420, filed on Mar. 12, 2002, provisional application No. 60/385,361, filed on Jun. 3, 2002.

(51) Int. Cl.
*H04N 7/16* (2006.01)
*H04J 11/00* (2006.01)
*G06F 11/00* (2006.01)

(52) U.S. Cl. ............ 370/230.1; 370/208; 370/235; 370/238; 370/471; 725/127; 725/260

(58) Field of Classification Search .......... 370/543, 370/200–488; 375/260, 261; 725/111–260
See application file for complete search history.

(56) References Cited

U.S. PATENT DOCUMENTS

| 5,889,765 | A | * | 3/1999 | Gibbs | 370/310.2 |
|---|---|---|---|---|---|
| 6,091,932 | A | * | 7/2000 | Langlais | 725/111 |
| 6,886,181 | B1 | * | 4/2005 | Dodds et al. | 725/119 |
| 7,068,712 | B1 | * | 6/2006 | Zang et al. | 375/222 |
| 7,086,712 | B2 | * | 8/2006 | Abello | 347/15 |
| 7,295,518 | B1 | | 11/2007 | Monk et al. | |
| 7,499,397 | B1 | * | 3/2009 | Monk et al. | 370/230.1 |
| 7,573,822 | B1 | | 8/2009 | Monk et al. | |
| 7,594,249 | B2 | * | 9/2009 | Gurantz et al. | 725/78 |

* cited by examiner

*Primary Examiner* — Afsar Qureshi
(74) *Attorney, Agent, or Firm* — Bruce Greenhaus; Duane Morris LLP

(57) ABSTRACT

A broadband local area data network uses coaxial cable wiring for interconnection of terminal devices. Orthogonal frequency division multiplexing (OFDM) with bit loading is used to overcome channel impairments and provide a path for terminal devices to transmit to and receive from other terminal devices. Probe messages are sent between devices to characterize the communication channel and determine optimum bit loading. The data network shares the cable spectrum with other services and uses frequency bands not used by other services. Adaptive power control can be used to maintain signal to noise ratio in a communication between terminal devices. Frequency coordination can be used to avoid interference between the LAN communications and other services transmitted on the cable.

7 Claims, 10 Drawing Sheets

BROADBAND NETWORK FOR COAXIAL CABLE USING MULTI-CARRIER MODULATION

RELATED APPLICATIONS

This application is a Divisional application of U.S. Ser. No. 12/538,339 filed Aug. 10, 2009, which is a continuation application of U.S. patent application Ser. No. 11/938,770 filed Nov. 12, 2007, now U.S. Pat. No. 7,573,822, which is a continuation application of U.S. patent application Ser. No. 10/322,834 filed Dec. 18, 2002, U.S. Pat. No. 7,295,518, which is a continuation application of U.S. patent application Ser. No. 10/230,687 filed Aug. 29, 2002 entitled "Broadband Network for Coaxial Cable Using Multi-carrier Modulation" now abandoned, which claims priority to U.S. provisional patent application No. 60/316,820, filed Aug. 30, 2001 entitled "Broadband Local Area Network Using Coaxial Cable"; U.S. provisional patent application No. 60/363,420 filed Mar. 12, 2002 entitled "Method of bit and energy loading to reduce interference effects in devices sharing a communication medium"; and U.S. provisional patent application No. 60/385,361, filed Jun. 3, 2002 entitled "Power loading to reduce interference effects in devices sharing a communication medium."

Related application: "Network interface and broadband local area network using coaxial cable" Ser. No. 09/910,412 filed Jul. 21, 2001.

TECHNICAL FIELD

This invention relates to broadband communication networks and specifically to communications using coaxial cable building wiring.

BACKGROUND

In a coaxial cable based local area network (LAN), communication between nodes occurs over a shared coaxial cable. When the coaxial cable used for the LAN is shared with a community aerial television or cable TV (CATV) service the signals must be separated to avoid interference. The LAN signal can use one band of frequencies and the cable TV service can use a different band. A typical cable TV configuration for a home is shown in FIG. 1. Signal splitters are used to distribute downstream signals from the point of entry (POE) to the various terminals in the home, which can include cable converter boxes, televisions, and cable modems, generally referred to as customer premise equipment (CPE). Each terminal device may have the ability to transmit as well as receive. The upstream signals transmitted by the terminal device flows through the signal splitters back to the POE and into the cable plant and are received by the head end. The signal splitters are functioning as signal combiners for upstream signals. Devices communicating with the head end generally do not communicate with each other.

Signal splitters are commonly used in home and other building type coaxial cable wiring. They have an input port and multiple output ports. The input port can also be considered a common port. The output ports can also be considered tap ports. Splitters are generally passive devices and can be constructed using lumped element circuits with discrete transformers, inductors, capacitors, and resistors. Splitters can also be constructed using strip line or microstrip circuits. A typical two-way splitter splits the power equally between the two output ports if each port is terminated equally. Thus each output would have a power level 3 dB lower than the input. Ideally, a splitter transfers all power from the input port to the output ports. In a practical implementation there is a modest power loss in the splitter due to impedance mismatches, non-zero resistances, dissipative losses in circuit elements, and other non-ideal properties. These losses amount to approximately 0.5 dB, thus a practical two-way splitter provides −3.5 dB power level to each output.

Splitters are generally bi-directional; they can also function as signal combiners, which sum the power from multiple ports into a single output. The ports used as outputs in a splitter configuration become inputs ports for the combining configuration. The common port becomes the output port.

A splitter may have 3 or more tap ports. There is typically an N-way splitter at the point of entry of a building that distributes the incoming CATV signal to each room of the building. The N-way splitter also combines the signals from each room, providing a return path for devices such as cable modems to transmit back to the cable head-end.

Splitters can be designed with power dividing ratios that are not equal. Instead of a 3 dB loss to each port, one port can have, for example 1.15 dB loss, and the other 6 dB. This corresponds to 75%/25% coupling. This type of splitter could be used to balance signal power at all terminal devices when there are multiple levels of signal splitters. A branch that terminates directly to a terminal device would be connected to a higher loss tap port. A branch that contains additional splitters would be connected to a lower loss tap port, which provides extra power to compensate for the loss of additional splitters.

Another characteristic of interest in signal splitters is the isolation between output ports. The isolation is typically between 10 dB and 40 dB. This isolation attenuates signals communicating between tap ports. The signal splitter/combiner is therefore directional, power flows to and from the common port to the tap ports, but power is attenuated between tap ports.

In a conventional cable TV or cable modem use, this isolation is desirable because terminal devices do not communicate with each other, they only communicate through the POE with the cable head-end. In a LAN system, terminal devices must communicate directly with each other, therefore attenuation between tap ports in the signal splitters results in an undesirable signal loss. Presenting a further problem to terminal to terminal communications is the variation in attenuation in different branches of the building wiring. All terminal devices are not connected directly to the main splitter, but may be connected at a secondary splitter, for example in a room. The level of attenuation between different pairs of terminal devices needing to communicate may vary by 10 to 40 dB or more.

Several buildings may be connected to one splitter at the street. Although the isolation of this splitter is high, some coupling between taps occurs, allowing transmission from one building to another. This is a source of interference between LANs in neighboring buildings.

Another approach to overcoming the splitter inter-port isolation is to replace the main splitter at the building POE with a symmetric power splitter/combiner. In a symmetric splitter, power entering any port is divided among the other ports. A symmetric splitter/combiner is not directional. This type of splitter has 3 dB or more additional loss compared to a directional signal splitter. The additional loss is greater depending on the number of tap ports. A power amplifier may be required to boost the signal to compensate for this loss. A bi-directional device, such as a cable modem, requires a reverse path so the amplifier needs to be bi-directional. Another disadvantage to this approach is that installation is required; each coax connected to the existing N-way directional splitter must be disconnected and moved to the new splitter. Another disadvantage of this approach is that power must be available for the amplifier, which is not generally present in the area a typical main splitter is located.

Imperfect terminations at connections create micro reflections within the cable wiring. The dominant main signal and reflected signal combine in the channel. A reflection anywhere in the wiring produces a multipath signal in some or all wiring branches that creates inter-symbol interference (ISI). The multipath signal has a delay and amplitude difference relative to the main signal. In the frequency domain, a reflection produces ripples in the response of the channel, creating amplitude variations across the pass band. In the time domain, ISI is seen as an impairment to the shape of the digital signal pulses. ISI will degrade the bit error rate (BER) performance of the communication channel. To overcome the effects of reflections, an adaptive equalizer is commonly used in the terminal device receiver. This creates a filter response that restores a flat frequency response impaired by the multipath signal.

The signals transmitted by LAN devices can create interference with televisions and set top boxes even though the LAN signals are out of band of these receivers, due to down conversion and signal mixing in the receivers.

Broadband networks are described in U.S. Pat. No. 5,889,765 "Bi-directional communications Network" issued to Gibbs, U.S. Pat. Nos. 5,940,387 and 6,005,861 "Home Multimedia Network Architecture" issued to Humpleman, U.S. Pat. No. 5,870,513 "Bi-directional Cable Network with a Mixing Tap or Suppressing Undesirable Noise in Signals From a Remote End of the Network" issued to Williams, U.S. Pat. No. 5,805,591 "Subscriber Network Interface" issued to Naboulsi, U.S. Pat. No. 6,008,368 "Ethernet Transport Facility Over Digital Subscriber Lines" issued to Rubinstain, U.S. Pat. No. 6,137,793 "Reverse Path Multiplexer for Use in High Speed Data Transmissions" issued to Gorman, and U.S. Pat. No. 6,091,932 "Bidirectional Point to Multipoint Network Using Multicarrier Modulation" issued to Langlais, each of which is incorporated herein by reference.

Gibbs discloses a broadband network overlaid with the cable service frequencies using dynamically allocated TDMA protocols. Humpleman patents disclose a home network using an active network interface unit to couple the home network to the external network. Williams discloses a method of reducing noise accumulated in the frequency bands used by an upstream signal. Naboulsi discloses an active network interface for an asynchronous transfer mode (ATM) network. Rubinstain discloses a method of transporting Ethernet over twisted pair lines. Gorman discloses an active reverse path multiplexer for communication between the cable head-end and subscriber cable modems. Langlais discloses a two-way data transmission system for communicating between an upstream and downstream unit using OFDM.

U.S. Pat. No. 6,091,932 "Bidirectional point to multipoint network using multicarrier modulation" issued to Langlais, incorporated herein by reference, discloses various techniques for implementing OFDM communication. This reference discloses the use of OFDM for communicating between a terminal device and the cable head-end.

U.S. Pat. No. 6,292,651 "Communication system with multicarrier transport distribution network between a head end terminal and remote units" issued to Dapper et al. incorporated herein by reference discloses communication between a cable head end and remote units and discloses techniques using OFDM for such communication. U.S. Pat. No. 5,959,967 "Digital transmission system" issued to Humphrey, incorporated herein by reference, discloses an OFDM transmission system used to communicate over a twisted pair loop. U.S. Pat. No. 5,371,548 "System for transmission of digital data using orthogonal frequency division multiplexing" issued to Williams incorporated herein by reference, discloses an OFDM system for data transmission during the vertical blanking interval of a television signal. U.S. Pat. No. 5,488,632 "Transmission and reception in a hostile interference environment" issued to Mason, incorporated herein by reference, discloses additional techniques for implementing an OFDM modulator and demodulator. U.S. Pat. No. 3,488,445 "Orthogonal Frequency Multiplex Data Transmission System" issued to Chang, incorporated herein by reference, and U.S. Pat. No. 3,511,936 "Multiply Orthogonal System for Transmitting Data Signals Through Frequency Overlapping Channels" issued to Saltzberg, incorporated herein by reference, disclose OFDM data transmission techniques.

A reflected signal and an attenuated signal passing through a splitter port creates a multipath environment. The received power level of the direct signal relative to the reflected signals can vary between equal levels to one signal being substantially greater than the other. The multipath environment impairs the ability to achieve high data rates in a communication network. The signal reflections and tap port isolation of splitters existing in a typical cable TV wiring configuration presents a problem for shared usage of the cable for a LAN system. The prior art references address communicating between a cable head end and in-home units but do not address the impairments present in the home wiring that restricts high bandwidth communication between devices within the home.

SUMMARY OF THE INVENTION

The present invention uses a form of multi-carrier modulation, orthogonal frequency division multiplex (OFDM), to transmit digital data signals through the coaxial cable wiring installed in homes. Communication is achieved through splitters and signal impairments caused by reflections and attenuation are overcome. Bit loading, along with power loading, adaptive power control, and frequency coordination can be used individually or in combination to implement a network that overcomes the problem of multipath and high attenuation in building cable wiring that would restrict the ability of terminal devices to communicate with each other.

Channel probing messages formed using a predetermined bit sequence and length are transmitted between network devices to estimate the channel characteristics, including the multipath characteristics and a profile of the signal to noise ratio over the frequency band of interest. The probe messages are transmitted using robust modulation, for example Quadrature Phase Shift Keying (QPSK), to insure the message can be received. The probe messages are transmitted without bit loading, that is, all carriers have the same robust modulation and all carriers have the same power. The receiving device processes the probe messages as received and determines the impairment present at each carrier frequency. Based on the estimate of the channel, bit loading is applied to increase the modulation order at carriers with high signal to noise ratio and lower the modulation order at carriers with low signal to noise ratio.

Power loading of the individual carriers forming the OFDM signal allows the data network signal to minimize interference to the other services using the cable. Selective avoidance of specific carrier frequencies avoids interference from the other services to the network signal.

The data network established allows point-to-point communication between any two devices connected to the network and point-to-multipoint communication for broadcast or multicast of data messages. The data network overlays cable or satellite services and uses parts of the frequency spectrum not used by these other services.

DETAILED DESCRIPTION OF THE INVENTION

Figure 1:
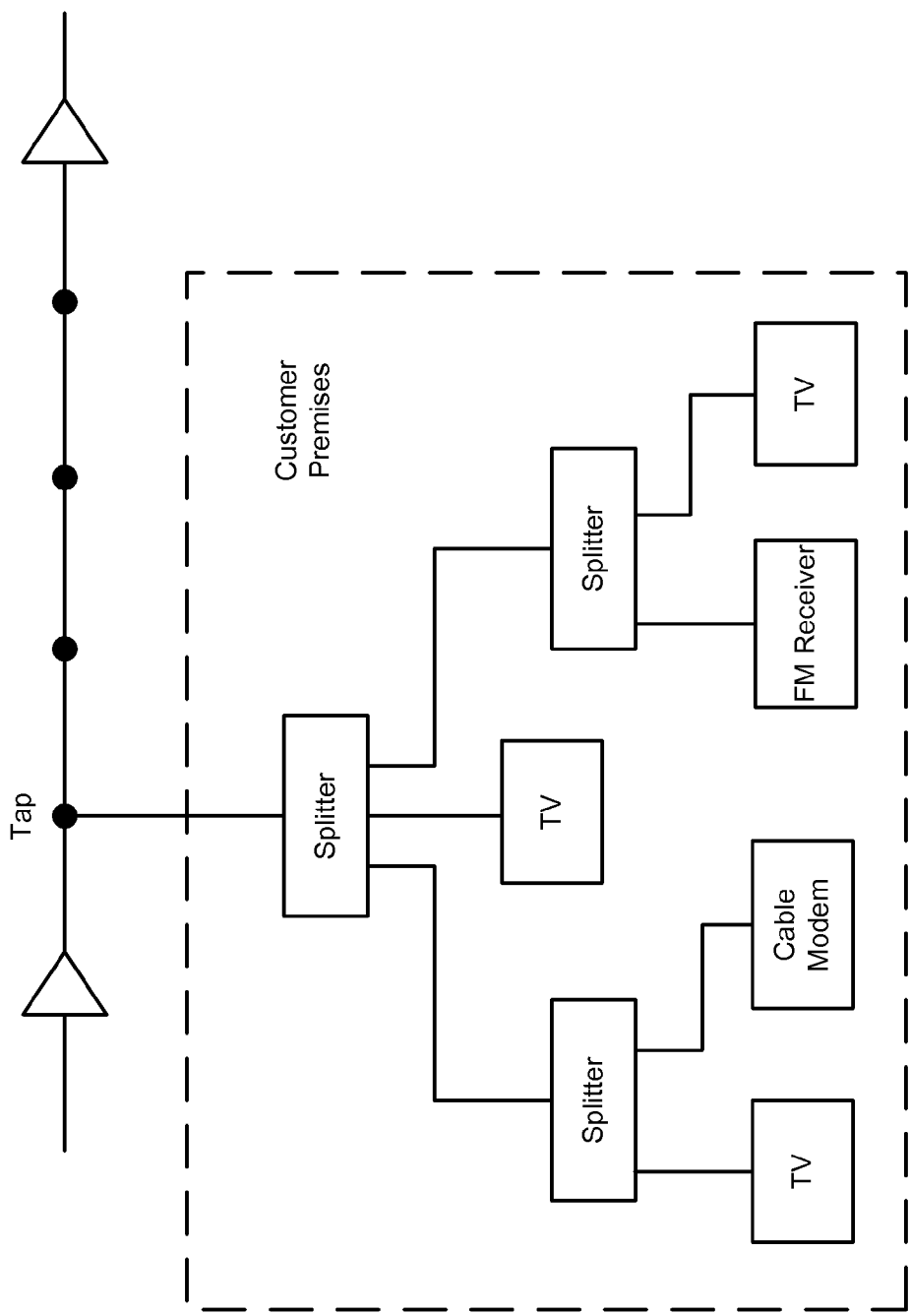
FIG. 1 is a diagram showing a prior art coaxial signal distribution plan.
Figure 2:
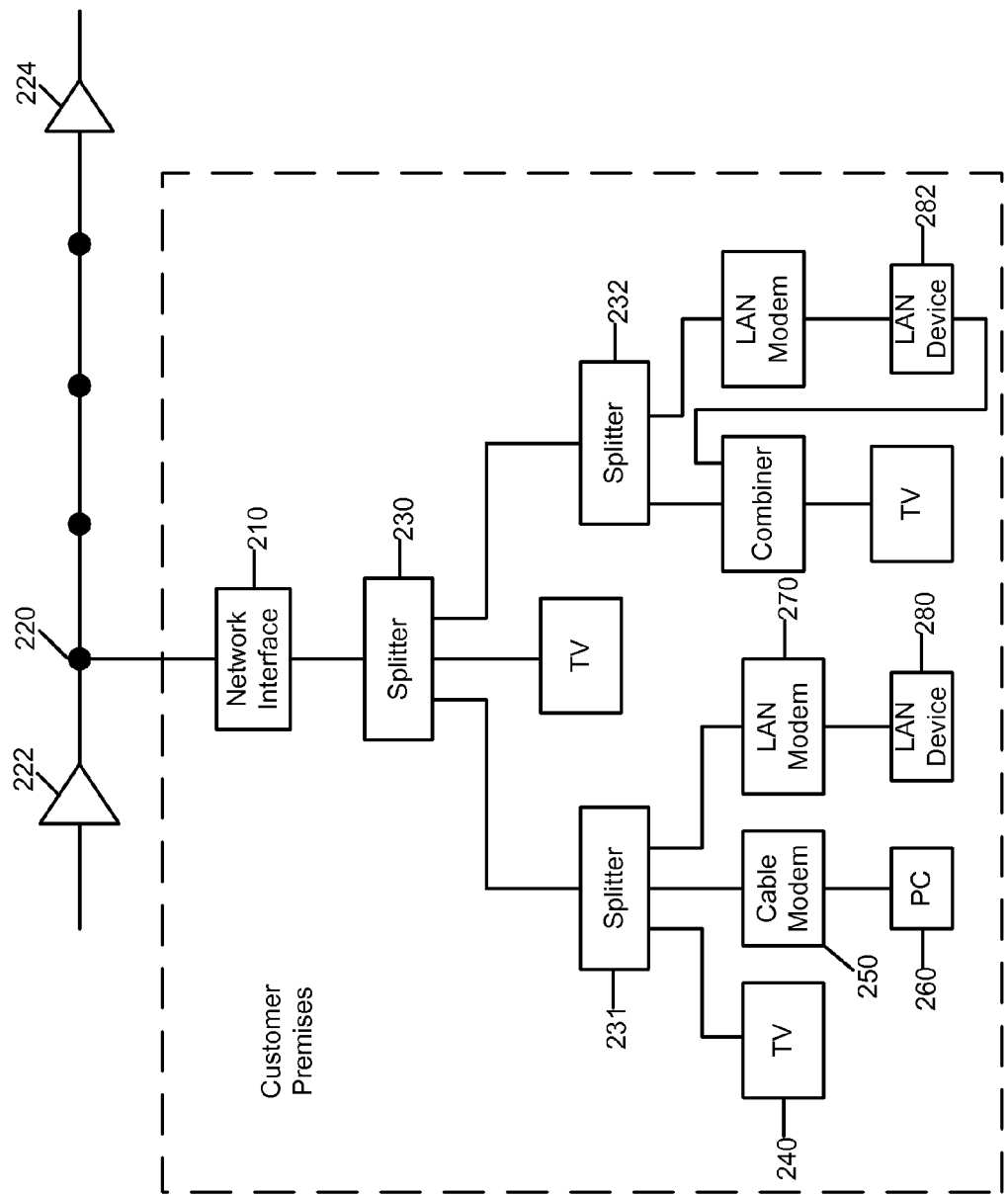
FIG. 2 is a diagram showing a signal distribution plan according to the present invention.

Referring to FIG. 2, LAN modem 270 provides modulation and demodulation of the waveform transmitted over the cable. LAN modem 270 has an interface to communicate with a LAN device 280, which is the source or destination of data transmitted over the LAN. LAN device 280 can be, for example, a personal computer (PC). LAN device 282 can be, for example, a modulator to produce a signal for driving a TV through a signal combiner. Network interface 210 is optional, it provides an additional signal coupling path between wiring branches if needed and is described more fully in co-pending application Ser. No. 09/910,412 "Network interface and broadband local area network using coaxial cable". Additional networks can be connected to taps in the cable plant. The networks can reside in the same or different building.

LAN devices 280 and 282 can be used for digital video services or data services. LAN device 282, for example, can extract digital video data from a transport stream, such as an MPEG stream, transmitted over the network and decode the transport stream to produce an analog video signal suitable for connection to a standard TV set.

Existing devices, such as TV 240 and cable modem 250 connected to PC 260, use frequency bands distinct from the frequency band used by the LAN and therefore operate in a normal manner.

The frequencies used by the LAN can be located above the standard cable use frequencies, which extend to 550 MHz, 750 MHz, or 850 MHz. Other frequency plans can be used, for example where a block of frequencies is available in the middle of the cable band. The filter cut-off frequencies are selected according to the frequencies bands used. Satellite systems generally use frequencies above 950 MHz to communicate the received signal from the outdoor unit (ODU) to the integrated receiver decoder (IRD) set top box. A LAN would use frequencies below 950 MHz in this case.

Figure 3:
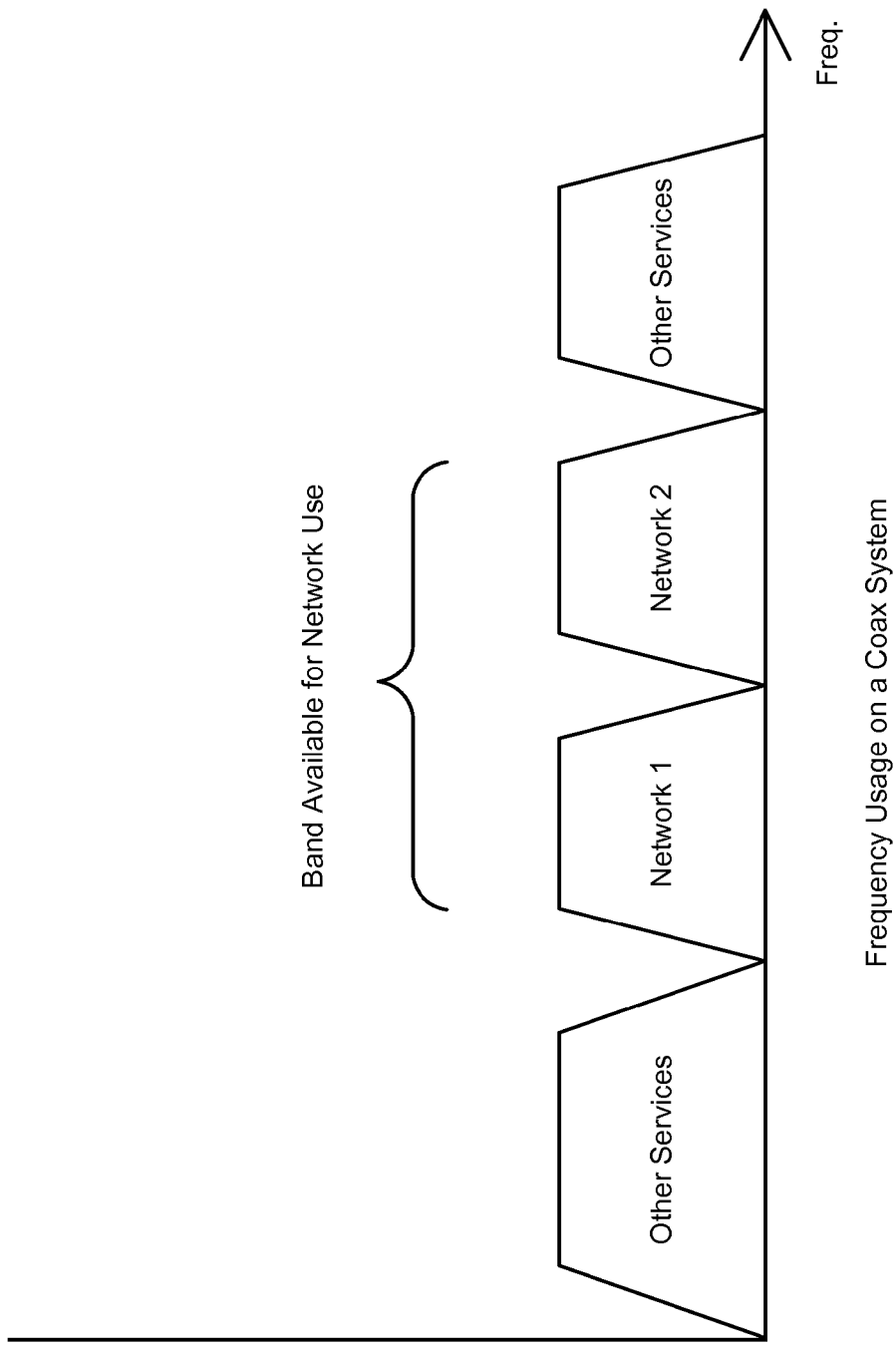
FIG. 3 shows a representative frequency allocation between network services and other services on a coaxial wiring system, including the use by two different networks.
Figure 4:
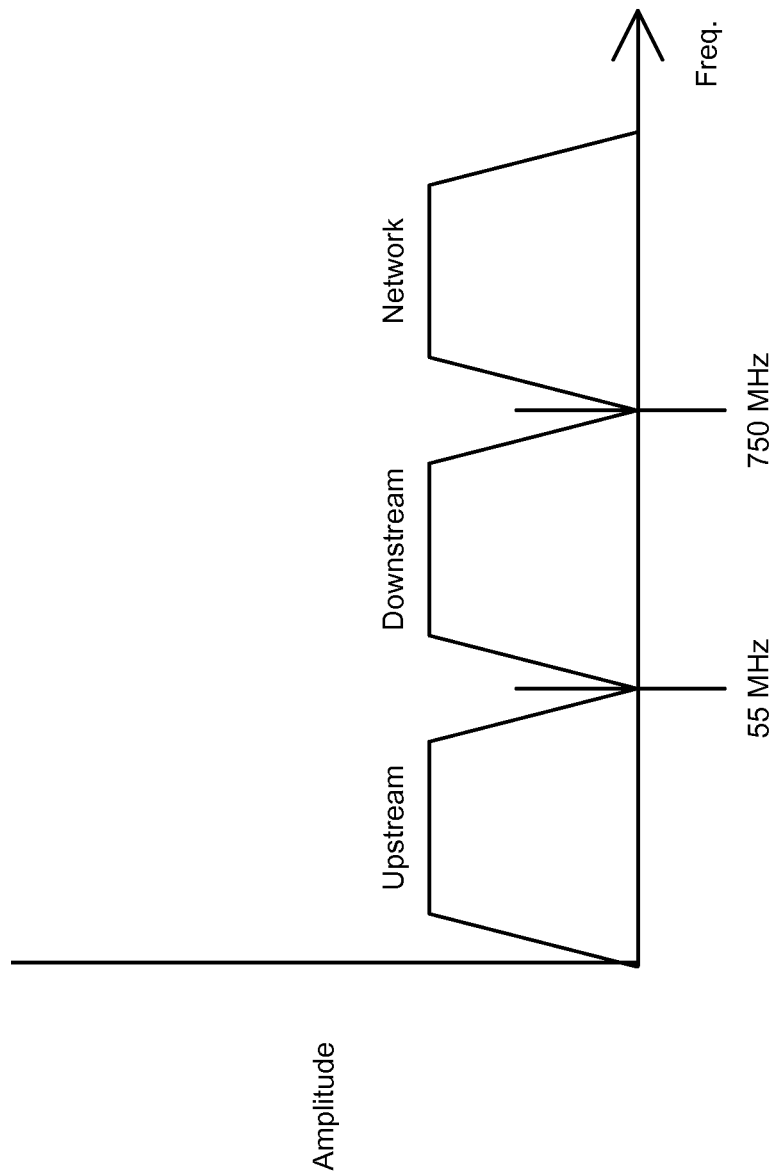
FIG. 4 shows a representative frequency allocation between cable service upstream/downstream signals and an overlaid local area network.

Referring to FIG. 3, more than one network can occupy the frequency band used for network services. The amount of spectrum used by a particular network depends on the data bandwidth needed for the service provided. FIG. 4 shows the spectrum used by cable upstream and downstream signals with a network signal using the spectrum above the cable band.

The present invention can use a time division duplex (TDD) protocol for communications. In a TDD system, receive and transmit data are communicated during different time intervals, generally using the same frequency. The advantage of using TDD is that the transceiver design is simplified. Different users share a common frequency channel through the use of time division multiple access (TDMA). In a TDMA system each user transmits during a different time interval. Users are assigned one or more slots of predetermined length in a framing structure that contains multiple slots. All users are synchronized by a beacon message broadcast on the network. The beacon message provides a common time reference to the users and can include other network management information.

Some building wiring possesses reflections due to mismatched impedances and inter-port coupling in splitters to provide sufficient signal path between terminal devices for communication. Loss from one terminal device to another is in the range of approximately 25 dB to 50 dB. In a coaxial cable environment signal-to-noise ratio (SNR) is generally high. To be useful the SNR is preferably in the range of 8 to greater than 30 dB.

Individual terminal devices will receive different power levels that vary according to the signal loss experienced between the transmitting device and the receiving device. An automatic gain control (AGC) circuit in the receiver levels the power presented to the intermediate frequency (IF) or base band processing sections. The AGC measures received power, at an RF, IF, or base band signal point and controls an amplifier to produce a constant level at the measurement point, or some other predetermined processing point.

Adaptive Power Control

The signal loss between terminal devices may be unknown and variable. In the present invention, an adaptive transmit power level is used to control the power level received by a terminal device. This function can be implemented in each terminal device or as part of the network management function provided by a central controller. An AGC circuit in the receiver can correct the residual variations in the signal power level.

An originating terminal device transmits a channel probing message to a responding terminal device for the purpose of determining received power level. The responding device measures the power and communicates a reply message containing the received power level. This message exchange can be transmitted using a robust modulation such as Binary Phase Shift Keying (BPSK) or QPSK, where the main messaging could be transmitted using higher order modulation, for example multilevel QAM.

Alternatively, the power measurement messaging can be transmitted using FM, which in not sensitive to power levels. Soft clipping in the RF, IF, and base band circuits may occur. This levels the signal and produces some harmonic content that is removed by low-pass filters and allows demodulation and decoding of the message.

The originating terminal device transmits the channel probing message at a predetermined power level. Alternatively, the message can embed a data field that indicates the transmitted power of the message. Using either source of information, the responding terminal device can adapt its transmitted power during the response to provide a desired power level at the originating device. By evaluating the received power measurement data in the response message, the originating device has a direct evaluation of the signal loss due to the channel. The power level of subsequent transmissions by the originating device to a responding device is set according to the channel loss measurement. An acknowledgement message is sent from the originating device to the responding device to conclude the communication establishment sequence.

In one embodiment, the power measurement can be made by observing the AGC control level, which represents the received power level.

OFDM Waveform Modulator and Demodulator

Multi-tone modulation uses a set of modulating carriers that are integer multiples of a common frequency and the symbol period is the inverse of the common frequency. Multi-tone modulation is also called discrete multi-tone (DMT) and orthogonal frequency division multiplexing (OFDM). OFDM utilizes QPSK and multi-level quadrature amplitude modulation (QAM) wherein each OFDM carrier can be modulated by an amplitude/phase-varying signal. QPSK is composed a sine and a cosine wave of identical frequency with phase modulation applied to each carrier independently. QAM is composed of sine and cosine waves with phase modulation and amplitude modulation. QPSK is an m-ary QAM signal with m=2. These signals can be represented using complex numbers. To modulate, data bits are encoded into a number of m-ary QAM constellations, which then modulate the respective carriers. The carriers are summed together for transmission over the channel. Each carrier is independent and can be independently decoded in the receiver. All carriers are related in frequency, being an integer multiple of a base frequency.

Micro reflections tend to have a time displacement relative to the main signal ranging from several nanoseconds to a few microseconds. If the time displacement is longer than an information symbol period ISI is created when the reflected signal from a prior symbol arrives during a later symbol. In OFDM, the user data bits generated at a high rate are distributed over many carriers, each with a lower data rate and therefore longer symbol period. At a symbol period longer than the multipath delay, the main and reflected signals arrive at a receiver during the same symbol reducing the effects of ISI. For example, if a data rate of 100 mbps is modulated using QPSK, which provides 2 bits per symbol; the symbol period is 20 nS. Using OFDM with 100 carriers, the data rate of each carrier is 1 mbps. With QPSK modulation the symbol period for each carrier is 2 uS.

OFDM processes all carriers as a block using a time to frequency transform. Furthermore, a cyclic prefix is added to the beginning of each OFDM symbol and transmitted to simulate periodicity. The cyclic prefix is created by replicating data from the end of the block at the beginning of the block. The length of the cyclic prefix is a function of the multipath time displacement. By adding a cyclic prefix to the transmitted data the OFDM signal is robust in a multipath environment by providing a guard interval between symbols. Hence, OFDM provides a mechanism to overcome the frequency selective channel impairments present in coaxial building wiring.

The OFDM waveform is generated by applying an inverse discrete Fourier transform (IDFT) to a complex vector that results in a real valued time domain sequence. The time domain sequence is applied to an upconverter to place the waveform at the proper RF frequency.

Bit loading is a method of allocating a higher order signal constellation to carriers that have higher signal to noise ratio and a lower order constellation to carriers that have lower signal to noise ratio. Higher SNR channels can support higher data capacity. Frequency bins occupying parts of the channel where the SNR is high can be used to transmit more bits. Each carrier may be modulated with a different order constellation, where higher SNR frequencies can bear a higher order constellation, and the resulting closer spacing of the constellation points. Frequencies with the lower SNR use lower order constellations such as QPSK. U.S. Pat. No. 6,438,174 "Multi-carrier transmission systems" issued to Isaksson, et al. incorporated herein by reference, discloses discrete multi-tone modulation and a technique for bit loading applied to point-to-point twisted pair wiring. U.S. Pat. No. 6,259,746 "Method for allocating data and power in a discrete multi-tone communication system" issued to Levin, et al. discloses a technique for bit loading applied to discrete multi-tone modulation.

The frequency channels in OFDM may be called frequency bins or simply bins. The power in individual frequency bins can be adjusted to compensate for insertion loss that varies as a function of frequency. The power level in regions of the channel can be altered by scaling the complex valued vector for the bins where power adjustment is needed before applying the inverse Fourier transform. In order to avoid interference with certain bands in the RF spectrum, the power level of certain bins can be reduced to zero.

An OFDM receiver uses a discrete Fourier transform (DFT) to convert the modulated signal back into data. The OFDM receiver receives all the carriers at once and performs the transform on a block of data points.

Various types of forward error correction can be applied to transmitted data blocks, such as Reed-Solomon and convolutional coding. Interleaving can be applied to data blocks to increase the robustness of the error correction. De-interleaving and error correction coding are applied in the receiver to recover the transmitted data without errors.

An OFDM receiver may also employ time domain equalization (TEQ), frequency domain equalization (FEQ), or both. Equalizers can be adaptive and may be of the decision feedback (DFE) type or decision directed type such as least mean square (LMS) algorithm.

Figure 5:
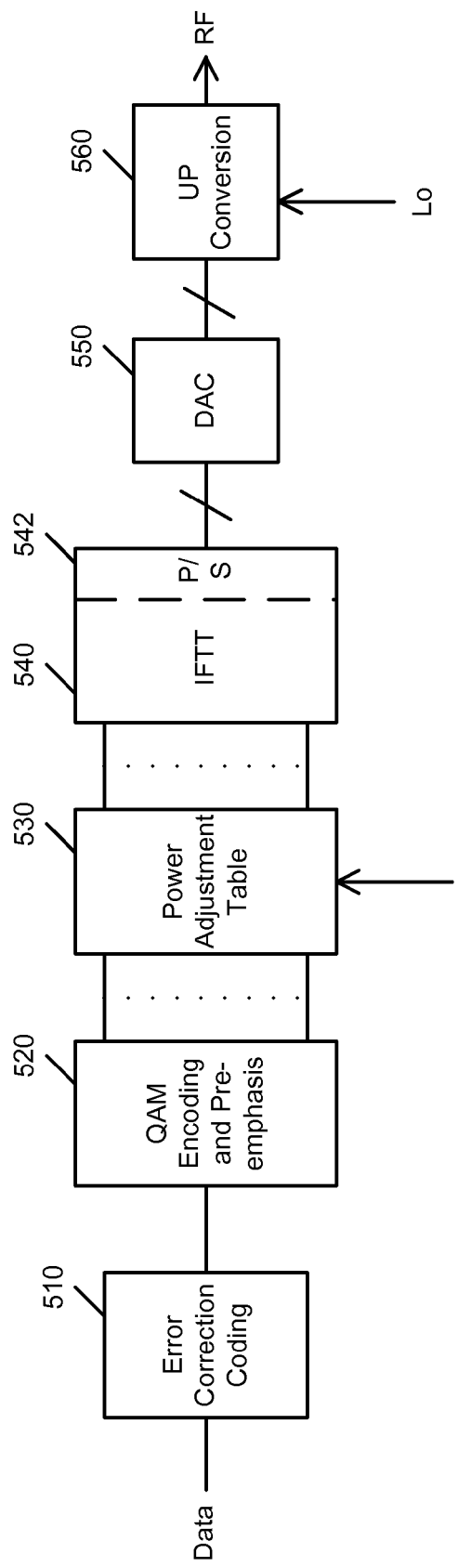
FIG. 5 shows a block diagram of an OFDM modulator in accordance with the present invention.

FIG. 5 shows a block diagram of a representative OFDM modulator according to the present invention. Data input is optionally coded with check bits by error correction coder 510 to facilitate error correction in the receiver. QAM encoder 520 divides the input data into many bit streams and applies a QAM symbol mapping to each bit stream. The bit streams correspond to the carriers. Symbol mapping maps a short sequence of bit, from 2 for QPSK to 8 for 256-QAM, into an I and Q amplitude value. The I and Q amplitude values output from QAM encoder 520 are modified by power adjustment table 530, which adjusts the amplitude levels to effect the power level of each carrier in the transmitted signal. The values in power adjustment table 530 are empirically derived or analytically derived and set to levels that avoid interference with other devices. Inverse Fast Fourier Transform (IFFT) 540 performs a frequency domain to time domain transformation that converts the complex series of frequency amplitude values into a time sequence. The IFFT output array is converted to a serial data stream by a parallel to serial converter 542 as part of IFFT 540. The digital time sequence is converted to an analog representation by digital to analog (DAC) 550. The analog signal is translated to a suitable carrier frequency by upconverter 560. The time sequence can be either real valued or complex valued samples. In the case of complex values, DAC 550 would be a dual DAC and upconverter 560 would be a quadrature modulator. An amplifier provides the appropriate overall power for the signal to be inserted into the communications medium.

Power adjustment table 530 may also be used to influence the order of modulation generated by QAM encoder 520 for each of the carriers. Higher power level carriers can support higher order of modulation and lower power levels require lower order modulation. The selection of QAM modulation order is bit loading, the selection of carrier power is power loading. The power profile used to avoid interference can alter both the power in each carrier and the number of bits transmitted in each symbol of each carrier.

Figure 6:
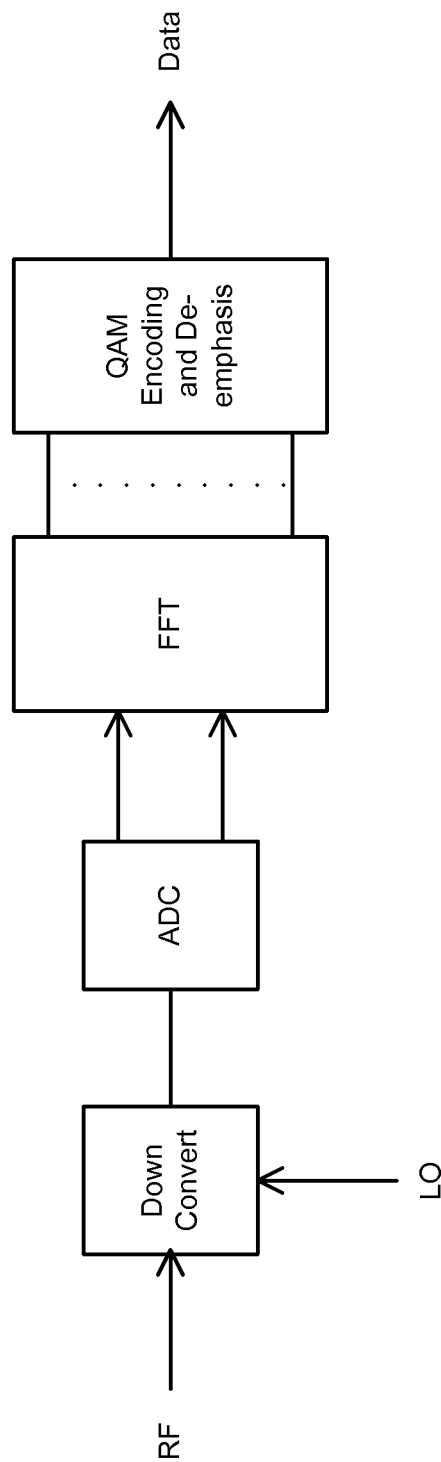
FIG. 6 shows a block diagram of an OFDM demodulator in accordance with the present invention.

FIG. 6 is a block diagram of a representative demodulator for use with the present invention. The inverse of the modulator operations are performed to reproduce digital data. Not shown are operations of carrier and symbol timing recovery, which can be performed using techniques well known in the art.

Multi-carrier system architecture is covered in *ADSL/VDSL Principles* by DR. Dennis J. Rauchmayer, Macmillan Technical Publishing, 1999 and *DSL Simulation Techniques and Standards Development for Digital Subscriber Line Systems* by Dr. Walter Y. Chen, Macmillan Technology Publishing, 1998, incorporated herein by reference.

Channel Probing Message

Channel probing messages are transmitted between network devices to estimate the channel characteristics. The channel probe uses a predetermined bit sequence which is known by the receiving device. By passing a known data sequence through the channel, the response of the channel can be determined, including multipath and SNR profile.

Probe packets are sent by devices upon command from a cycle master. This request for transmission of a probe message may be periodic or as part of scheduled activity. A probe packet is analyzed by the receiving node, a bit loading profile is computed, and the bit loading information is transmitted back to the sending node. The sending node then uses the requested bit loading until a new bit loading is requested by the receiving node.

In a symmetric channel the receiving device can determine bit loading for transmitting its own messages based on channel characteristics measured from a received probe message. The bit loading is valid for sending messages to the device that transmitted the probe message. In a non-symmetric channel, the receiving device must communicate the results of the analysis, either as raw data or as a bit loading profile, back to the sending device for the sending device to modify the transmission parameters.

Figure 7:
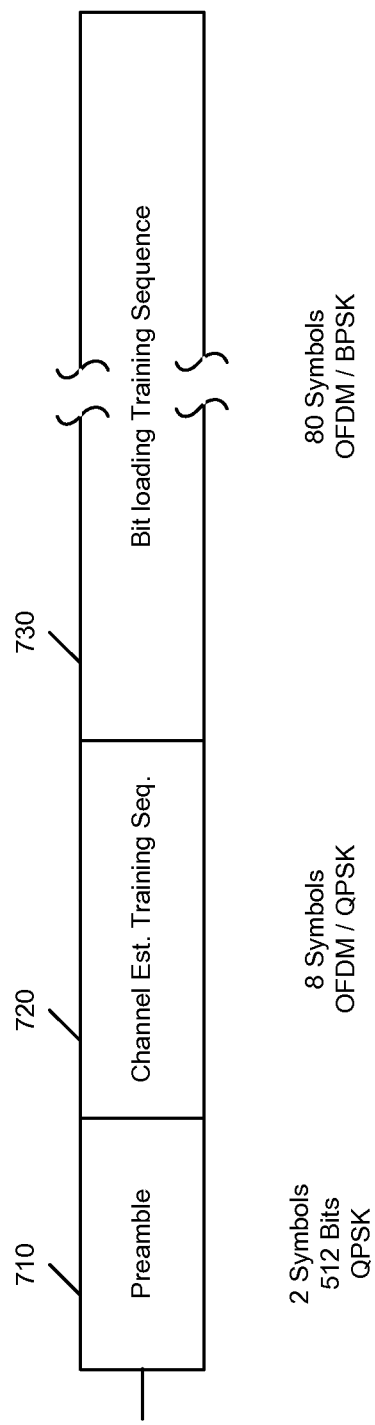
FIG. 7 shows an example of a bit loading probe message in accordance with the present invention.

FIG. 7 shows an example of a bit loading probe message 700, comprised of a preamble 710, channel estimation training sequence 720, and a bit loading training sequence 730. The preamble portion 710 of the message 700 is used to compute an estimate of the carrier frequency offset and sample timing offset. The preamble 710 is 2 OFDM symbols in length transmitted in time domain as 512 bits. The channel estimation training sequence 720 is 8 OFDM symbols transmitted in the frequency domain with 256 carriers using QPSK modulation and is used to compute the transfer function of the channel. From the transfer function, equalizer coefficients are computed and loaded the taps of an equalizer. The remaining portion of the probe message is processed with the benefit of equalization on the signal.

The bit loading training sequence 730 is 80 symbols transmitted in the frequency domain using BPSK modulation and is used to compute the actual bit loading needed for data traffic. The bit loading training sequence provides for averaging over a large number of symbols. The SNR in each frequency bin is calculated and the bit loading profile is generated. Determination of a channel response, multipath, and SNR profile from a known signal is well known in the art. The data pattern chosen for the preamble and training sequences can be a pseudo-random data sequence of the specified length. A preferred pattern for the preamble uses a selected pattern for the first half of the preamble and a bit inversion of the selected pattern for the second half of the preamble. This pattern provides desirable auto-correlation properties.

Schmidl, et al. "Robust Frequency and Timing Synchronization for OFDM", IEEE Transactions on Communications, vol. 45, No. 12, pp. 1613-1621 (1997) and Minn, et al. "On Timing Offset Estimation for OFDM Systems", IEEE Communications Letters, Vol. 4, No. 7, pp. 242-244, incorporated herein by reference, describe techniques for forming and processing sequences to synchronize receivers to data transmissions over frequency-selective channels.

The signal processing and computations performed on signal samples needed for modulating, demodulating, channel estimation, and other operations can be performed by dedicated hardware resources or by a programmed signal processor. A typical system will utilize both hardware and software techniques to perform the needed signal processing. Signal processing circuitry can be integrated into a single system on a chip (SOC), partitioned into several chips, or programmed into a field programmable gate array (FPGA).

Figure 8:
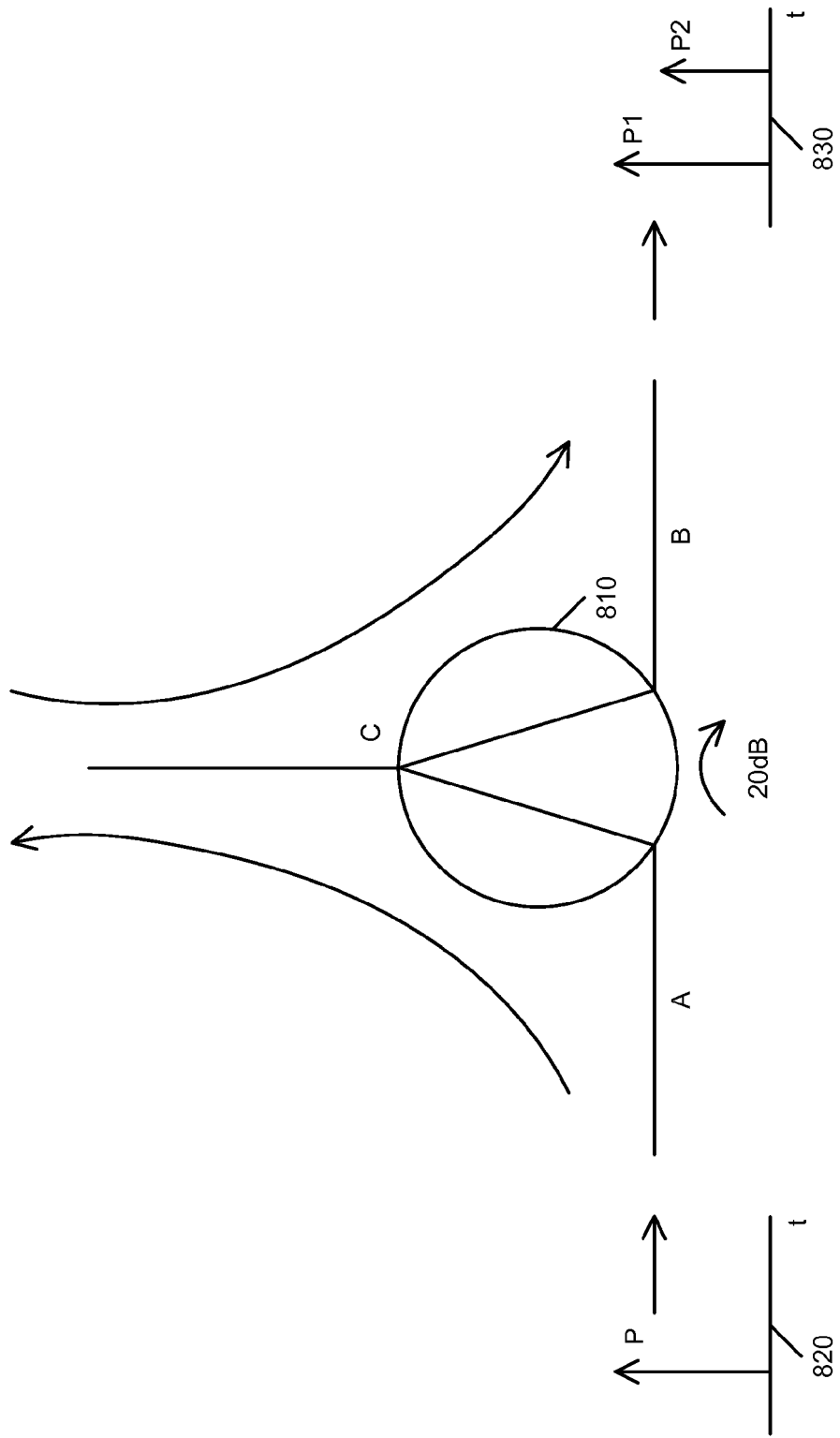
FIG. 8 shows a multipath signal created by a splitter.

FIG. 8 shows a schematic representation of a splitter 810 with a signal burst 820 of power P entering splitter port A. The signal burst will couple to port B with attenuation of, for example, 20 dB producing signal P1. The signal burst will also couple to port C with a loss of 3.5 dB and pass up the wiring branch to a point that produces some reflection with a particular attenuation. The reflected signal will pass down the wiring branch to splitter port C and couple to port B with a power level of P2. The resulting signal 830 present at port B will be a signal burst of power P1 followed by the echo of power P2. Depending on the level of the reflection and the isolation from port A to port B, the first signal burst arriving at port B can be higher or lower in power than the second signal burst arriving. The time displacement of the two arrivals is dependent upon the cable length of the wiring branch connected to port C.

Figure 9:
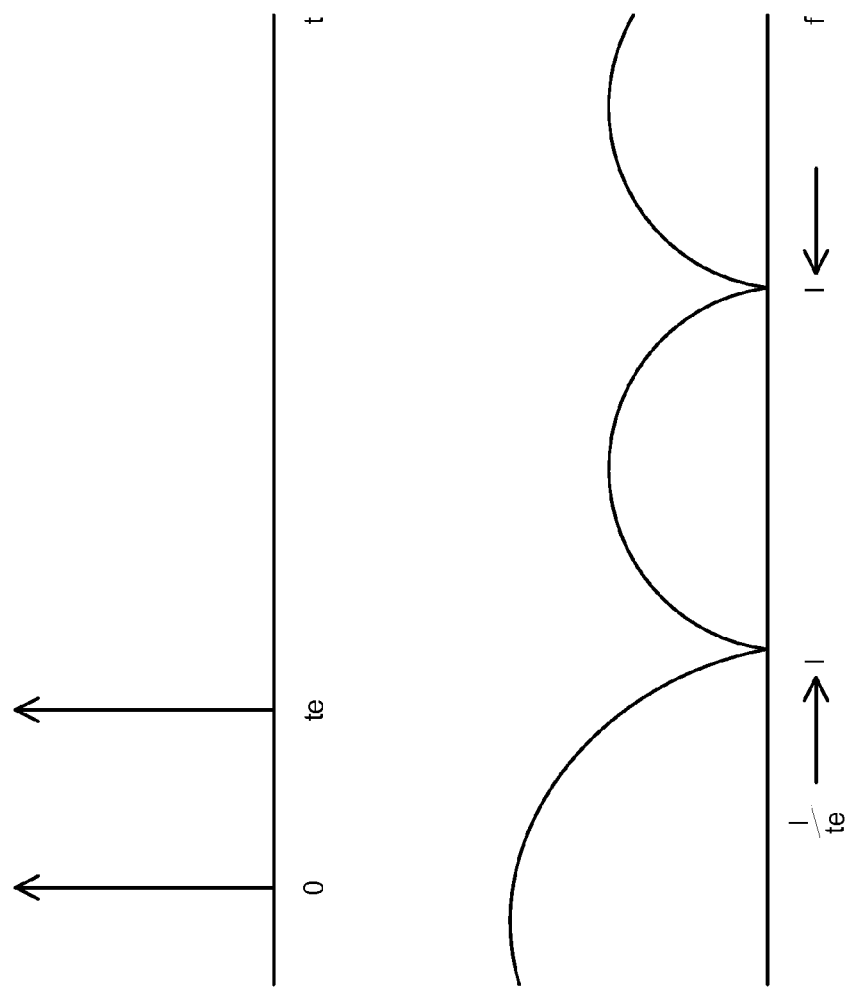
FIG. 9 shows a time domain and frequency domain plot of a signal experiencing multipath.

FIG. 9 shows a time domain plot of two signal bursts, one arriving at time 0 and the other arriving at time $t_e$. The corresponding frequency domain plot shows nulls in the spectrum with a separation of $1/t_e$. This diagram shows the effect of two time displaced signals arriving at a single point and the effect on the frequency response of the signal.

Figure 10:
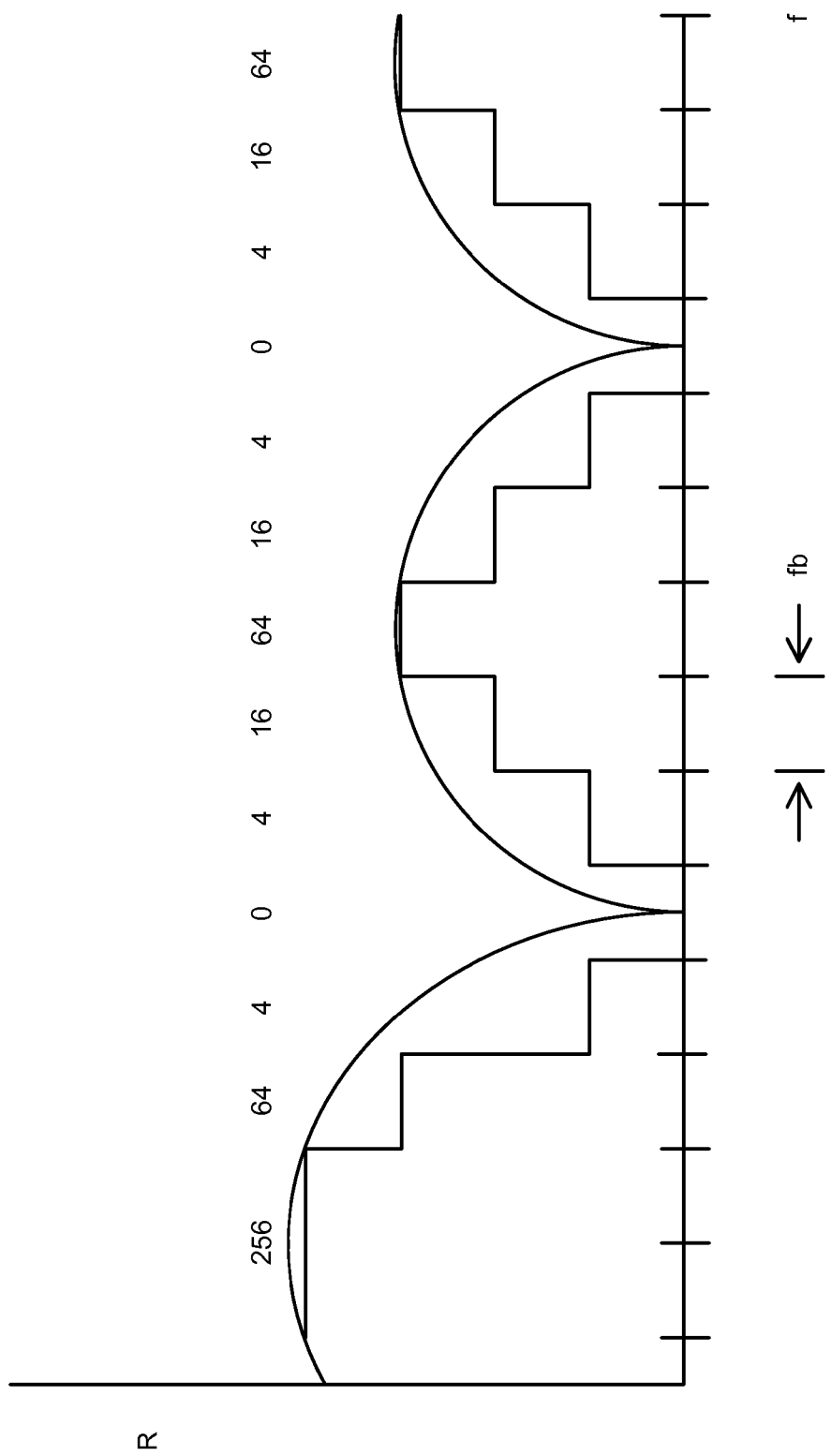
FIG. 10 shows a bit loaded OFDM waveform in accordance with the present invention overlaid on an impaired frequency response.

FIG. 10 shows a bit loaded OFDM waveform in accordance with the present invention overlaid on an impaired frequency response. The band used to transmit the OFDM signal is segmented into frequency bins of width $f_b$. Each frequency bin is encoded with a QAM constellation of 4, 16, 64, or 256 points. The level of response through the channel at each frequency bin, which corresponds to the SNR, determines the order of modulation used. The higher the channel response in a particular bin, the more information is encoded by using a higher density constellation. Frequencies bins located at deep nulls may have insufficient SNR to support a useful signal and are not used. No signal is transmitted in these bins.

Frequency Coordination

When a terminal device is powered up, it scans the available frequency band to determine if there is communication activity occurring and determine the frequencies that are already in use. This activity can be originating from a network in the same building as the terminal device, another building where the signal is leaking through the tap, or from cable or satellite services sharing the cable. The scan can be done using the same receiver signal path that is used for data communication. An FFT performed on an array of data samples taken from the A/D converter provides information about signal activity in the channel. The LO can be changed to sweep the scan over a wider frequency band than a single FFT. The step size can be from less than 1 MHz to 10 MHz or more, and depends on the frequency spacing established for the network.

Alternatively to the FFT approach, detection of activity can be achieved by measuring the received signal power with an envelope detector, which can be done using digital samples or an AM detector using a diode and filter circuit. Another approach to envelope detection is monitoring an automatic gain control (AGC) level that represents the received signal strength.

Another approach to activity detection is to fully demodulate the received signal and decode the data stream. Using this technique, the terminal can recognize a network or device identifier contained in the data frames to decide if the activity is from a desired network or undesired network. If a desired network is detected, the terminal will attempt to gain access. If an undesired network is detected, the frequency band used will be logged as unusable. The network or device ID can be transmitted in a base coding modulation, such as QPSK. This allows the scanning terminal to synchronize to and decode enough information to identify the activity without knowing the specific modulation used in the terminal specific and payload portions of the frame.

Once a clear area of the available frequency band is determined, the network controller node can begin transmitting network access information to allow other devices to gain access to the network within the home.

An alternative to frequency coordination between networks is to insert a blocking filter at the POE of the home. This prevents egress of signals from the home and ingress of signals from other homes. The filter is a low pass or band pass filter that allows CATV signals to pass unaffected and blocks the frequencies used by the network. An additional benefit is to insure privacy of the network data. The communication activity scan would then detect any cable or satellite services and use other frequency bands for the network.

What is claimed is:

1. A network device comprising:
   a) a multi-carrier modulator for forming a probe message comprising a preamble, a channel estimation training sequence, and a bit loading training sequence wherein the probe message is formed using orthogonal frequency division multiplexing (OFDM); and
   b) a transmitter for transmitting the probe message through the communication channel during an assigned slot in a framing structure that contains multiple slots over coaxial cable.

2. The device of claim 1, wherein:
   a) the preamble is a predetermined sequence of Quadrature Phase Shift Keying (QPSK) encoded data bits;
   b) the channel estimation training sequence is a predetermined sequence of QPSK encoded OFDM symbols; and
   c) the bit loading training sequence is a predetermined sequence of Binary Phase Shift Keying (BPSK) encoded OFDM symbols.

3. The device of claim 1, wherein the modulator forms a beacon message and the transmitter broadcasts the beacon message, the beacon message providing a common time reference for synchronization of data network terminals receiving the beacon message.

4. A chip for use in a network device, the chip comprising:
   a) a multi-carrier modulator for forming a probe message comprising a preamble, a channel estimation training sequence, and a bit loading training sequence wherein the probe message is formed using orthogonal frequency division multiplexing; and
   b) a transmitter for transmitter for transmitting the probe message through the communication channel during an assigned slot in a framing structure that contains multiple slots over coaxial cable.

5. The chip of claim 4, wherein the chip further comprises a receiver for receiving bit loading information and wherein the multi-carrier modulator uses the bit loading information to modulate future transmissions.

6. A network device comprising:
   a) a receiver for receiving probe messages from a sending network device, the probe messages comprising a preamble, a channel estimation training sequence, and a bit loading training sequence, wherein the probe message was formed using OFDM;
   b) a demodulator for demodulating the OFDM probe messages;
   wherein the network device estimates the channel characteristics based upon the received probe messages.

7. The network device of claim 6, further including a transmitter, wherein the bit loading training sequence is used to compute a bit loading profile and wherein the transmitter transmits back, to the node from which the bit loading training sequence was sent, bit loading information determined from the bit loading profile.

* * * * *